(12) United States Patent
Liu et al.

(10) Patent No.: US 9,933,570 B2
(45) Date of Patent: Apr. 3, 2018

(54) INTEGRATION OF V-GROOVES ON SILICON-ON-INSULATOR (SOI) PLATFORM FOR DIRECT FIBER COUPLING

(71) Applicant: Futurewei Technologies, Inc., Plano, TX (US)

(72) Inventors: Zongrong Liu, Pleasanton, CA (US); Qianfan Xu, San Jose, CA (US); Rongsheng Miao, San Jose, CA (US); Hongmin Chen, Davis, CA (US); Xiao Shen, San Bruno, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/057,638

(22) Filed: Mar. 1, 2016

(65) Prior Publication Data
US 2017/0254954 A1    Sep. 7, 2017

(51) Int. Cl.
| | |
|---|---|
| *G02B 6/36* | (2006.01) |
| *G02B 6/136* | (2006.01) |
| *G02B 6/132* | (2006.01) |
| *G02B 6/30* | (2006.01) |
| *G02B 6/12* | (2006.01) |

(52) U.S. Cl.
CPC ............. *G02B 6/136* (2013.01); *G02B 6/132* (2013.01); *G02B 6/30* (2013.01); *G02B 6/3652* (2013.01); *G02B 2006/121* (2013.01)

(58) Field of Classification Search
CPC ............. G02B 6/36; G02B 6/30; G02B 6/136
USPC ........................................................ 385/14
See application file for complete search history.

(56) References Cited

U.S. PATENT DOCUMENTS

| | | | | |
|---|---|---|---|---|
| 4,466,696 A | * | 8/1984 | Carney | G02B 6/30 372/7 |
| 5,420,953 A | * | 5/1995 | Boudreau | G02B 6/4204 385/33 |
| 5,481,629 A | * | 1/1996 | Tabuchi | G02B 6/42 385/14 |

(Continued)

FOREIGN PATENT DOCUMENTS

| | | |
|---|---|---|
| CN | 104335088 A | 2/2015 |
| KR | 20020059289 A | 7/2002 |

OTHER PUBLICATIONS

Machine Translation and Abstract of Korean Publication No. KR20020059289, Jul. 12, 2002, 10 pages.

(Continued)

*Primary Examiner* — Kaveh C Kianni
(74) *Attorney, Agent, or Firm* — Conley Rose, P.C.

(57) ABSTRACT

A method for fabricating a photonic integrated circuit (PIC) comprises providing a wafer comprising an insulator layer positioned between a top semiconductor layer and a base semiconductor layer, patterning the top semiconductor layer to simultaneously define a waveguide and a first etch mask window for forming a fiber-guiding v-groove that substantially aligns to an axis of optical signal propagation of the waveguide, removing a first portion of the top semiconductor layer to form the waveguide according to the patterning, removing a second portion of the top semiconductor layer to form the first etch mask window according to the patterning, and forming the fiber-guiding v-groove according to the first etch mask window.

19 Claims, 7 Drawing Sheets

(56) References Cited

U.S. PATENT DOCUMENTS

| | | | | |
|---|---|---|---|---|
| 5,548,673 | A * | 8/1996 | Kitamura | G02B 6/30 385/49 |
| 5,600,745 | A * | 2/1997 | Wuu | G02B 6/132 385/49 |
| 5,684,902 | A * | 11/1997 | Tada | G02B 6/423 385/49 |
| 5,700,382 | A * | 12/1997 | Splett | G02B 6/30 216/2 |
| 6,316,281 | B1 * | 11/2001 | Lee | G02B 6/136 385/14 |
| 6,510,275 | B1 | 1/2003 | Tran et al. | |
| 6,888,989 | B1 * | 5/2005 | Zhou | G02B 6/3636 385/131 |
| 2002/0051607 | A1 * | 5/2002 | Ido | G02B 6/125 385/49 |
| 2003/0021014 | A1 * | 1/2003 | Barenburg | H01S 5/4031 359/344 |
| 2003/0215187 | A1 | 11/2003 | Tidmarsh et al. | |
| 2006/0120669 | A1 * | 6/2006 | Blauvelt | G02B 6/12002 385/50 |
| 2008/0089637 | A1 * | 4/2008 | Farah | G02B 6/30 385/14 |
| 2009/0011065 | A1 * | 1/2009 | Nakagawa | B81C 1/00531 425/174.4 |
| 2012/0099611 | A1 * | 4/2012 | Kim | H01S 5/141 372/20 |
| 2013/0114924 | A1 * | 5/2013 | Loh | G02B 6/1245 385/14 |
| 2015/0010266 | A1 * | 1/2015 | Webster | G02B 6/122 385/14 |
| 2015/0140720 | A1 | 5/2015 | Collins | |

OTHER PUBLICATIONS

Foreign Communication From a Counterpart Application, PCT Application No. PCT/CN2017/073063, English Translation of International Search Report dated Apr. 26, 2017, 4 pages.

* cited by examiner

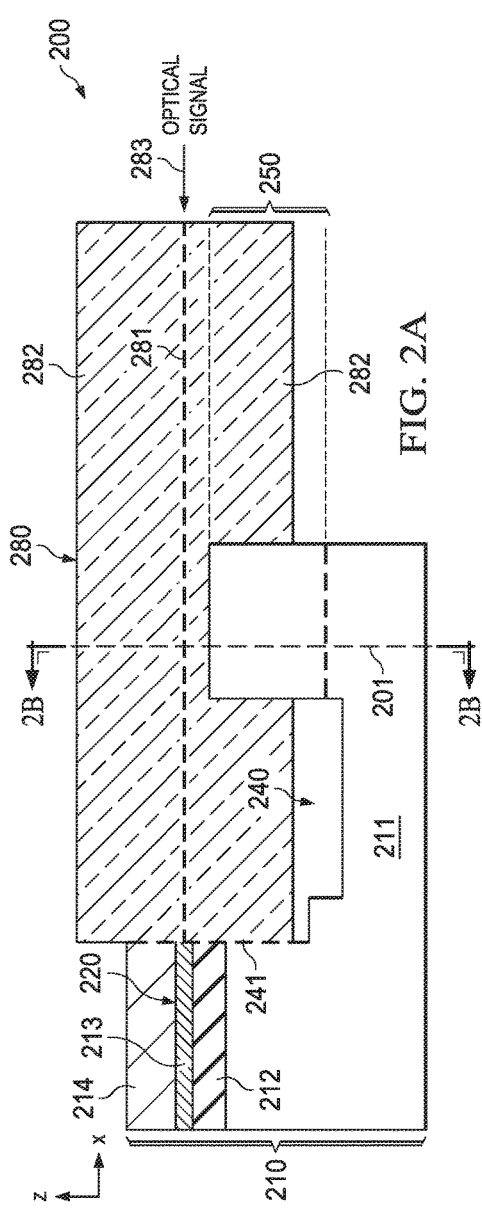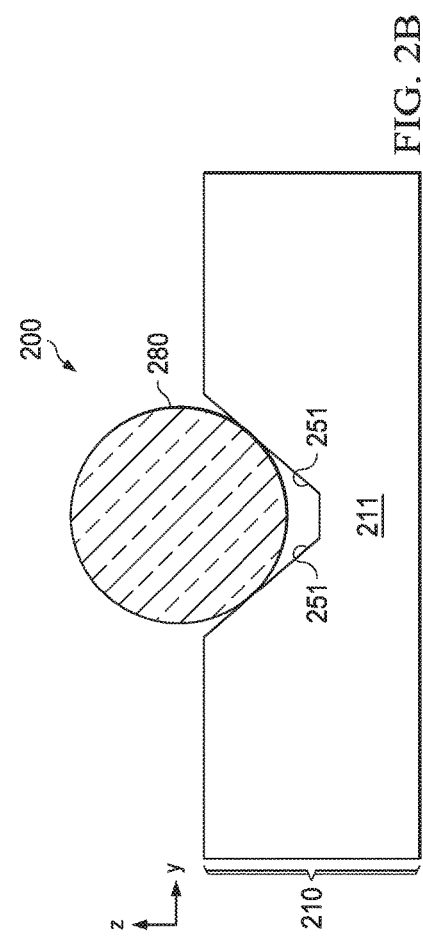

INTEGRATION OF V-GROOVES ON SILICON-ON-INSULATOR (SOI) PLATFORM FOR DIRECT FIBER COUPLING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical fibers have been widely used for the propagation of optical signals, especially to provide high-speed communication links. Optical links using fiber optics comprise various advantages over electrical links, for example, comparatively large bandwidths, high noise immunity, reduced power dissipation, and minimal crosstalk. Optical signals carried by optical fibers may be processed by a wide variety of optical and/or optoelectronic devices, including integrated circuits.

Photonic integrated circuits (PICs) comprising waveguides are used as optical components in constructing an optical system. In order for a PIC to function as an optical component in an optical system, optical fibers are connected to waveguides formed on the PIC. Thus, photonic integration, or light coupling between optical fibers and waveguides formed on PICs, is becoming increasingly important in optical systems.

SUMMARY

In one embodiment, the disclosure includes a method for fabricating a photonic integrated circuit (PIC), comprising: providing a wafer comprising an insulator layer positioned between a top semiconductor layer and a base semiconductor layer; patterning the top semiconductor layer to simultaneously define a waveguide and a first etch mask window for forming a fiber-guiding v-groove that substantially aligns to an axis of optical signal propagation of the waveguide; removing a first portion of the top semiconductor layer to form the waveguide according to the patterning; removing a second portion of the top semiconductor layer to form the first etch mask window according to the patterning; and forming the fiber-guiding v-groove according to the first etch mask window. In some embodiments, the method further comprises depositing, after removing the first portion and the second portion, a cladding layer over the top semiconductor layer, the waveguide, and the first etch mask window; forming, using a dry etching process, a trench between the waveguide and the first etch mask window; depositing a protection layer over the cladding layer and the trench; and patterning the protection layer to define a second etch mask window with a second window center and a second window size so that the second window center substantially vertically aligns to a first window center of the first etch mask window, wherein the second window size is larger than a first window size of the first etch mask window; removing a third portion of the protection layer to form the second etch mask window; removing a fourth portion of the cladding layer according to the second etch mask window to reopen the first etch mask window; forming the fiber-guiding v-groove comprises removing a fifth portion of the insulator layer according to the first etch mask window to form a third etch mask window for forming the fiber-guiding v-groove, wherein the first etch mask window, the second etch mask window, and the third etch mask window each comprises a rectangular shape, and wherein removing the third portion, the fourth portion, and the fifth portion creates an opening with step-structured side walls extending from the protection layer to a second top surface of the base semiconductor layer; forming the fiber-guiding v-groove further comprises applying a wet etchant through the opening into the base semiconductor layer to form the fiber-guiding v-groove in the base semiconductor layer; applying the wet etchant comprises forming undercuts of the insulator layer, and wherein the method further comprises removing the undercuts by using a buffering agent; the trench extends vertically from a first top surface of the cladding layer to the wafer and extends laterally from the waveguide to the first etch mask window, and wherein the method further comprises: removing a first region of the wafer between the trench and the fiber-guiding v-groove such that the fiber-guiding v-groove comprises a first open end along the axis and connecting to the trench; and removing a second region of the wafer between the fiber-guiding v-groove and an edge of the wafer such that the fiber-guiding v-groove further comprises a second open end opposite to the first open end along the axis; removing the first region and the second region comprises dicing the wafer from the first top surface of the cladding layer towards the base semiconductor layer; removing the first region and the second region comprises: patterning the protection layer to define a first area corresponding to the first region and a second area corresponding to the second region; and etching the first region and the second region.

In another embodiment, the disclosure includes a photonic integrated circuit (PIC) prepared by a process comprising the steps of: providing a silicon-on-insulator (SOI) wafer comprising an insulator layer positioned between a top silicon layer and a base silicon layer; patterning the top silicon layer to simultaneously define a waveguide and a first etch mask window for forming a fiber-guiding v-groove that substantially aligns to an axis of optical signal propagation of the waveguide; removing a first portion of the top silicon layer to form the waveguide according to the patterning; removing a second portion of the top silicon layer to form the first etch mask window according to the patterning; and forming the fiber-guiding v-groove according to the first etch mask window. In some embodiments, the process further comprises: depositing, after removing the first portion and the second portion, a cladding layer over the top silicon layer, the waveguide, and the first etch mask window; forming, using a reactive-ion etching (RIE) process, a trench between the waveguide and the first etch mask window; depositing a protection layer over the cladding layer and the trench; and patterning the protection layer to define a second etch mask window with a second window center and a second window size so that the second window center substantially vertically aligns to a first window center of the first etch mask window, wherein the second window size is larger than a first window size of the first etch mask window; the process further comprises: removing a third portion of the protection layer to form the second etch mask window; removing a fourth portion of the cladding layer according to the second etch mask window to reopen the first etch mask window, and wherein forming the fiber-guiding v-groove comprises removing a fifth portion of the insulator layer according to the first etch mask window to form a third etch mask window for forming the fiber-guiding v-groove; forming the fiber-guiding v-groove further comprises applying a wet etchant through the second etch mask window into the base silicon layer to form the fiber-guiding v-groove in the base silicon layer; applying the wet etchant comprises forming undercuts of the insulator layer, and wherein the process further comprises removing the undercuts by using a buffered hydrofluoric (BHF) solution; the trench extends vertically from a top surface of the cladding layer into the wafer and extends laterally from the waveguide to the first etch mask window, and wherein the process further comprises dicing from the top surface of the cladding layer partially through the wafer to: remove a first region of the wafer between the trench and the fiber-guiding v-groove such that the fiber-guiding v-groove comprises a first open end along the axis connecting to the trench; and remove a second region of the wafer between the fiber-guiding v-groove and an edge of the wafer such that the fiber-guiding v-groove further comprises a second open end opposite to the first open end along the axis.

In yet another embodiment, the disclosure includes an optical device comprising: a base semiconductor layer comprising a fiber-guiding v-groove; a top semiconductor layer comprising a waveguide; an insulator layer positioned between the base semiconductor layer and the top semiconductor layer; and an opening that extends from the top semiconductor layer to the fiber-guiding v-groove, wherein the fiber-guiding v-groove is substantially optically aligned to the waveguide. In some embodiments, the base semiconductor layer and the top semiconductor layer comprise silicon, and wherein the insulator layer comprises silicon dioxide ($SiO_2$); the fiber-guiding v-groove comprises: two v-shaped sidewalls opposite each other and extending along a direction of an optical path of the waveguide; a v-groove bottom surface connecting the two v-shaped sidewalls; the method further comprises a vertical trench connecting the waveguide to the fiber-guiding v-groove, wherein the vertical trench comprises a trench bottom surface positioned in the base semiconductor layer at a greater depth than the v-groove bottom surface.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts. It should be understood that the drawings are not necessarily to scale.

FIG. 2A is a side view of a PIC and an optical fiber in a coupling position according to an embodiment of the disclosure.

FIG. 2B is a cross-sectional view of the PIC in FIG. 2A according to an embodiment of the disclosure.

DETAILED DESCRIPTION

Figure 1A:
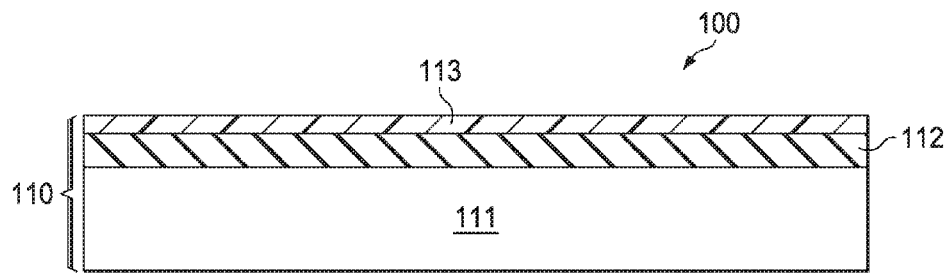
FIG. 1A is a side view of a portion of a wafer according to an embodiment of the disclosure.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One of the challenges in photonic integration is to achieve efficient light coupling between fibers and silicon-on-insulator (SOI) waveguides fabricated on PICs at a low cost. The large difference in dimensions between fibers and SOI waveguides causes high insertion loss. For example, an SOI waveguide comprises a cross section in a submicron size range that is less than one micrometer (μm), while a single-mode fiber (SMF) comprises a cross section that is tens of micrometers (μm). One approach to coupling optical signals between an optical fiber and an SOI waveguide on a PIC is to mount the optical fiber on a sub-mount, which is on a substrate separate from the PIC, and assemble the sub-mount with the PIC using either grating coupling or edge coupling. The light coupling efficiency depends on the accuracy of the alignment between the core of the optical fiber and the SOI waveguide. One approach to aligning an optical fiber to an SOI waveguide is to employ active alignment. Active alignment refers to the process of sending an optical beam through the core of an optical fiber and into a waveguide and measuring the optical power received at a given point along the waveguide. The alignment is adjusted such that a maximum optical power is received at the given point in the waveguide. Although active alignment provides high alignment accuracy, active alignment is time-consuming and costly.

Disclosed herein are various embodiments for creating high precision fiber-guiding v-grooves and waveguides on a same PIC by defining the fiber-guiding v-grooves as part of the waveguide fabrication process. The disclosed embodiments fabricate a waveguide and a fiber-guiding v-groove on an SOI wafer comprising a buried oxide (BOX) layer disposed between an SOI layer and a base silicon layer. The fabrication defines a waveguide and an etch mask window substantially aligned to an optical signal propagation axis of the waveguide in the same photo pattern or photo mask and transfers the photo pattern onto an SOI layer of the wafer via photolithography, for example. The SOI layer is etched according to the transferred photo pattern to form the waveguide and the etch mask window in the SOI layer. The etch mask window is used to form a fiber-guiding v-groove on the same SOI wafer as the waveguide. The disclosed embodiments employ various processes such as dry etching, wet etching, and dicing to form the fiber-guiding v-groove. The disclosed embodiments perform dicing from a device side or a functional side of the SOI wafer. By integrating the fabrication of the waveguide and the fiber-guiding v-groove into the same photolithography step, an optical fiber may be passively attached to the fiber-guiding v-groove to couple optical signals in and out of the waveguide. The self-alignment by passive attachment is referred to as passive alignment, which relies on the structure of assemblies and components instead of additional optical measurements. Thus, passive alignment reduces production cost and time. The disclosed embodiments are suitable for use in creating any number of waveguides and any number of fiber-guiding v-grooves on a PIC.

FIGS. 1A-1L collectively illustrate an embodiment of a method 100 of fabricating a PIC with integrated fiber-guiding v-grooves for direct fiber coupling. For illustration purposes, the method 100 illustrates the fabrication of a single v-groove that is substantially lithographically aligned to a single waveguide. However, the method 100 is suitable for fabricating any number of fiber-guiding v-grooves and waveguides.

FIG. 1A is a side view of a portion of a wafer 110 according to an embodiment of the disclosure. The method 100 begins with fabrication on the wafer 110. The wafer 110 comprises a base semiconductor layer 111, an insulator layer 112, and a top semiconductor layer 113. The insulator layer 112 is disposed between the top semiconductor layer 113 and the base semiconductor layer 111. The insulator layer 112 is constructed from a material such as silicon dioxide ($SiO_2$) or another suitable oxide material. The insulator layer 112 is referred to as a buried oxide (BOX) layer. The top semiconductor layer 113 and the base semiconductor layer 111 are constructed from a material such as silicon (Si) or another suitable semiconductor material. Thus, the top semiconductor layer 113 may be referred to as an SOI layer. The top semiconductor layer 113 is used for forming waveguides and any other optical functions. The top semiconductor layer 113 functions also as a dry etch mask for etching the insulator layer 112. The insulator layer 112 functions as a wet etch mask for forming a v-groove in the base semiconductor layer 111, as described more fully below.

Figure 1B:
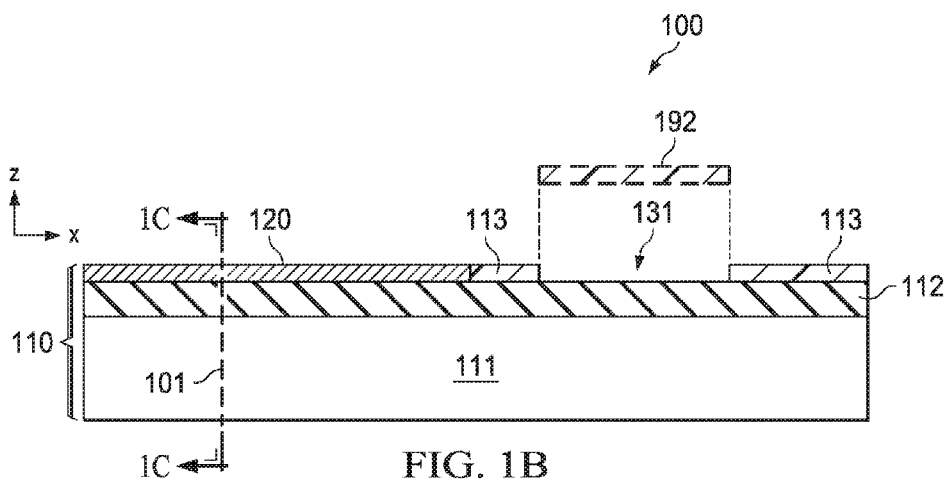
FIG. 1B is a side view of the wafer in FIG. 1A after patterning and etching to form a waveguide and a first etch mask window according to an embodiment of the disclosure.

FIG. 1B is a side view of the wafer 110 in FIG. 1A after patterning and etching to form a waveguide 120 and a first etch mask window 131 according to an embodiment of the disclosure. The top semiconductor layer 113 is patterned using photolithography and etched using a dry etching process such as reactive-ion etching (RIE). Photolithography is a process that uses light to transfer a geometric pattern from a photo mask to a light-sensitive chemical photoresist (PR) coating on a substrate, such as the top semiconductor layer 113. RIE is a type of dry etching that uses chemically reactive plasma to remove material deposited on a wafer substrate such as the top semiconductor layer 113. For example, a first photo mask (not shown) is generated with a first pattern that defines the waveguide 120 and the first etch mask window 131 aligning to the x-axis, and a first PR coating (not shown) is disposed on top of the top semiconductor layer 113. The x-axis is along an optical propagation axis of the waveguide 120. The z-axis is substantially perpendicular to both a plane of the wafer 110 and the x-axis. The photolithography process transfers the first pattern onto the top semiconductor layer 113. The RIE process removes first portions (not shown) and a second portion 192 of the top semiconductor layer 113 according to the transferred first pattern to form the waveguide 120 and the first etch mask window 131, respectively. The first portions are shown in FIG. 1C.

Figure 1C:
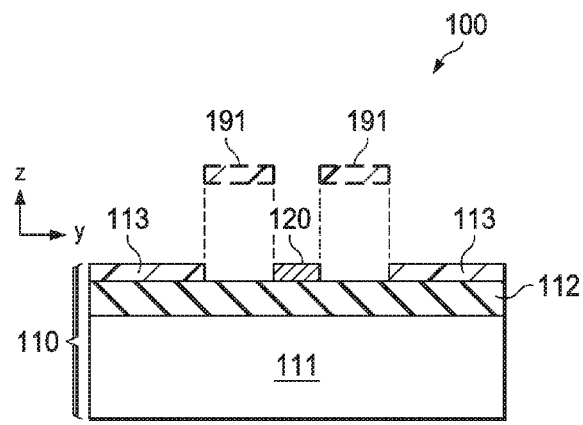
FIG. 1C is a side cross-sectional view of the wafer in FIG. 1B according to an embodiment of the disclosure.

FIG. 1C is a side cross-sectional view of the wafer 110 in FIG. 1B according to an embodiment of the disclosure. The cross-sectional view is taken along a line 101 of FIG. 1B as viewed in the direction indicated by the arrows. The y-axis is substantially perpendicular to both the z-axis and an optical propagation axis of the waveguide 120, which corresponds to the x-axis shown in FIG. 1B. As shown, the waveguide 120 is formed in the top semiconductor layer 113, where first portions 191 are removed from the top semiconductor layer 113.

Figure 1D:
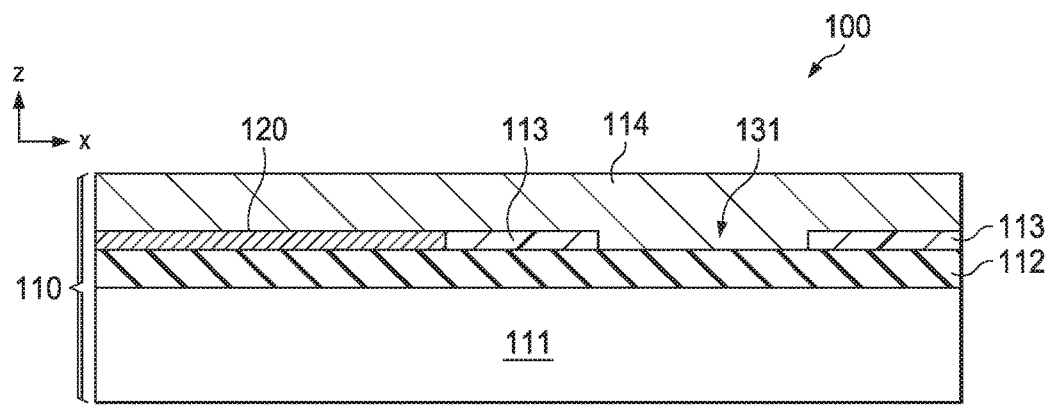
FIG. 1D is a side view of the wafer in FIG. 1B after deposition of a cladding layer according to an embodiment of the disclosure.

FIG. 1D is a side view of the wafer 110 in FIG. 1B after deposition of a cladding layer 114 according to an embodiment of the disclosure. The cladding layer 114 is constructed from a material such as silicon oxide ($SiO_x$), silicon nitride ($SiN_x$), silicon carbide (SiC), silicon carbonitride (SiCN) or another suitable material. The cladding layer 114 is disposed over the top semiconductor layer 113, the waveguide 120, and the first etch mask window 131. The deposition of the cladding layer 114 is performed in one or more steps to provide a flat surface for the wafer 110. For example, other functional layers may be formed on top of the cladding layer 114.

Figure 1E:
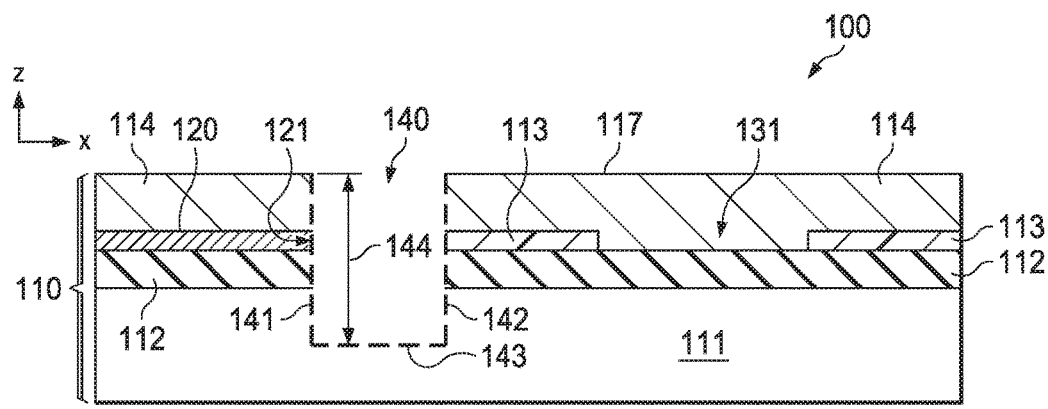
FIG. 1E is a side view of the wafer in FIG. 1D after patterning and etching to form a trench according to an embodiment of the disclosure.

FIG. 1E is a side view of the wafer 110 in FIG. 1D after patterning and etching to form a trench 140 according to an embodiment of the disclosure. The cladding layer 114 is patterned to define a trench 140 between the waveguide 120 and the first etch mask window 131 using photolithography. The cladding layer 114, the top semiconductor layer 113, and the insulator layer 112 are etched using a dry etch process such as RIE, and the base semiconductor layer 111 is etched using deep reactive-ion etching (DRIE) to form the trench 140. DRIE is a highly anisotropic etching process used to create deep penetration, steep-side holes, and trenches in wafers with high aspect ratios. The trench 140 comprises a first trench vertical sidewall 141 and a second trench vertical side wall 142 connected by a first trench bottom surface 143. The first trench vertical sidewall 141 is opposite to the second trench vertical sidewall 142 along the x-axis. The trench 140 extends vertically from a top surface 117 of the cladding layer 114 into the wafer 110 and laterally along the x-axis between the waveguide 120 and the first etch mask window such that a facet 121 of the waveguide 120 is adjacent to a portion of the first trench vertical sidewall 141. The DRIE process is controlled such that the distance between the first trench vertical sidewall 141 and the facet 121 of the waveguide 120 is less than about 2 μm. The first trench vertical sidewall 141 is used as an x-direction stop while attaching an optical fiber such as an SMF to the waveguide 120. The trench 140 further comprises a first trench depth 144. The DRIE process is controlled such that the first trench depth 144 matches the diameter of the optical fiber.

Figure 1F:
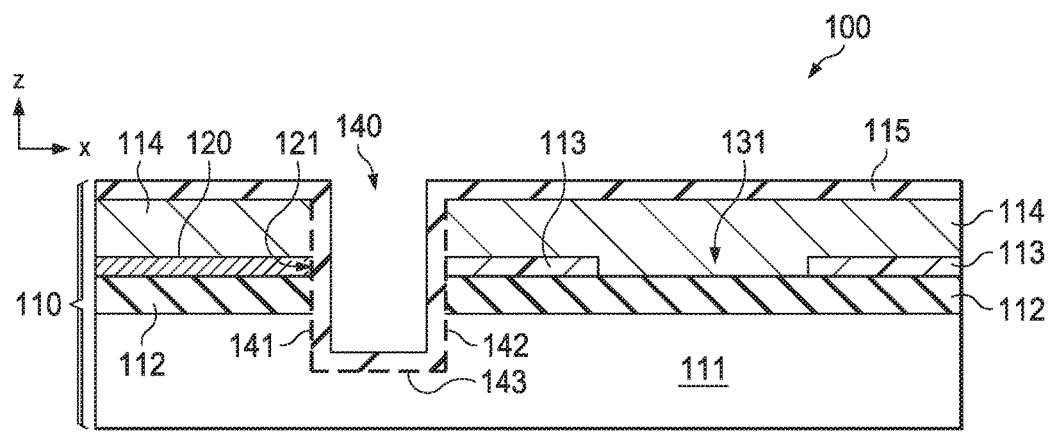
FIG. 1F is a side view of the wafer in FIG. 1E after deposition of a protection layer according to an embodiment of the disclosure.

FIG. 1F is a side view of the wafer 110 in FIG. 1E after deposition of a protection layer 115 according to an embodiment of the disclosure. The protection layer 115 is constructed from a material such as SiNx or another suitable protection material such as $SiO_x$. The protection layer 115 is disposed over the cladding layer 114 and the trench 140, including the first trench sidewall 141, the second trench sidewall 142, and the first trench bottom surface 143. The protection layer 115 is formed using a plasma-enhanced chemical vapor deposition (PECVD) process or another suitable deposition technique. PECVD is a process that deposits thin films from a gas state or vapor to a solid state on a substrate, such as the cladding layer 114. The deposition of the protection layer 115 may comprise a deposition depth of about 200 nanometer (nm).

Figure 1G:
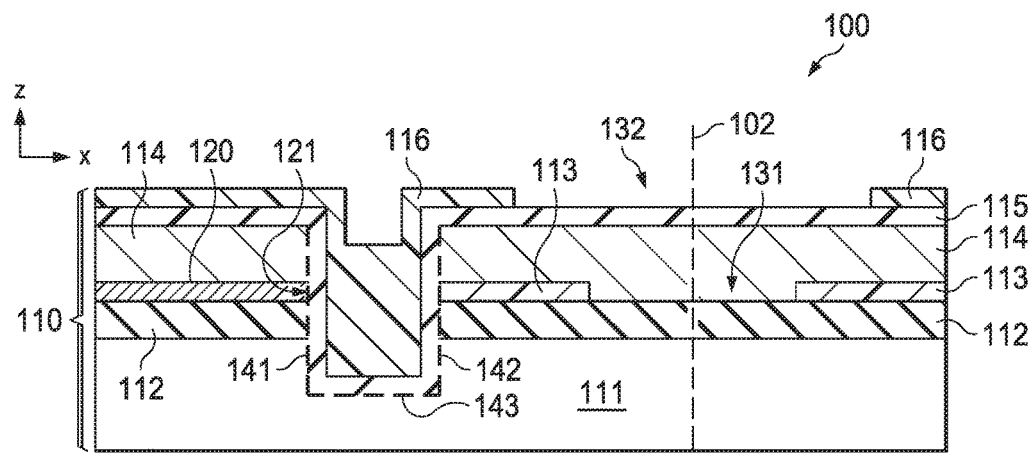
FIG. 1G is a side view of the wafer in FIG. 1F after transferring of a photo pattern that defines a second etch mask window according to an embodiment of the disclosure.

FIG. 1G is a side view of the wafer 110 in FIG. 1F after transferring of a photo pattern 116 that defines a second etch mask window 132 according to an embodiment of the disclosure. For example, the photo pattern 116 is transferred onto the protection layer 115 using photolithography. As shown, the center of the second etch mask window 132 is substantially vertically aligned to the center of the first etch mask window 131 along a direction of the z-axis as shown by the dashed line 102. For example, the first etch mask window 131 and the second etch mask window 132 each comprises rectangular surfaces in a plane of the wafer 110. The center refers to a midpoint of any diagonals of a rectangular surface. In addition, the second etch mask window 132 comprises a larger opening or window size than the first etch mask window 131.

Figure 1H:
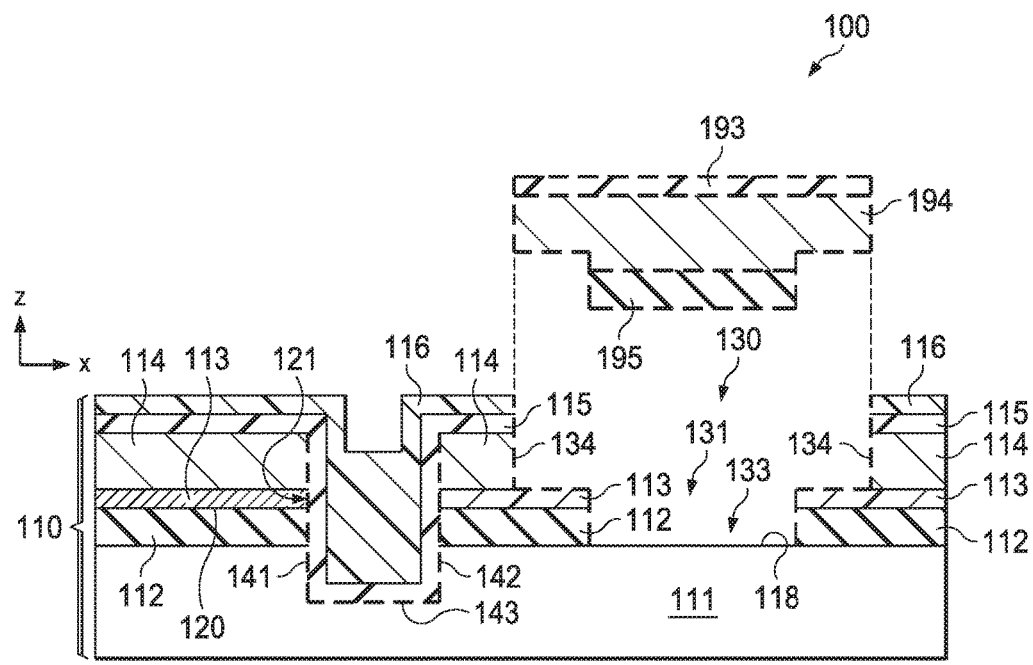
FIG. 1H is a side view of the wafer in FIG. 1G after etching to form a third etch mask window according to an embodiment of the disclosure.

FIG. 1H is a side view of the wafer 110 in FIG. 1G after etching to form a third etch mask window 133 according to an embodiment of the disclosure. The etching uses RIE to remove a third portion 193 of the protection layer 115, a fourth portion 194 of the cladding layer 114, and fifth portion 195 of the insulator layer 112. The etching reopens the first etch mask window 131 and creates an opening 130 for subsequent wet etching, as described more fully below. The opening 130 extends from the protection layer 115 to a second top surface 118 of the base semiconductor layer 111. It should be noted that etching rates are different for different materials. For example, the etching rate for Si in the top semiconductor layer 113 is slower than the etching rate for $Si_3N_4$ in the protection layer 115. Thus, the opening 130 comprises step-structured sidewalls 134 and the RIE process is configured to generate the desired v-groove mask pattern.

Figure 1I:
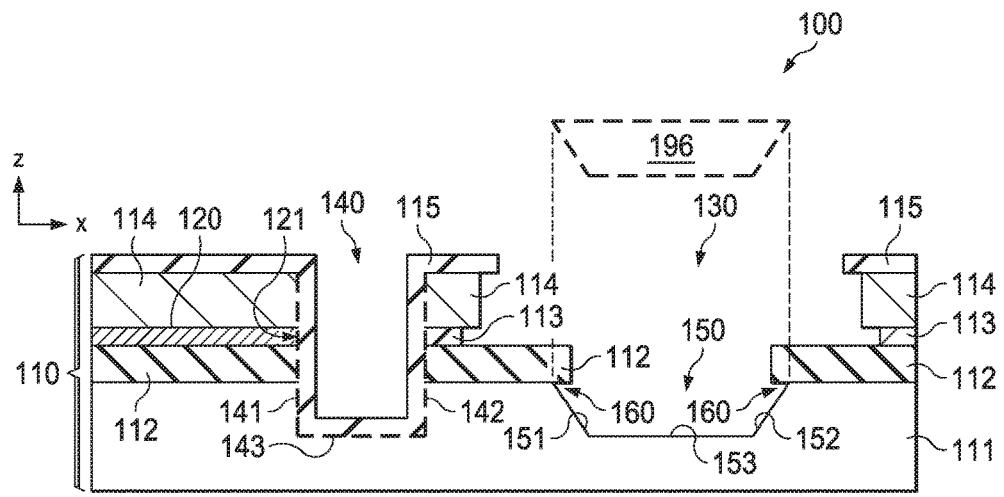
FIG. 1I is a side view of the wafer in FIG. 1H after wet etching to form a fiber-guiding v-groove according to an embodiment of the disclosure.

FIG. 1I is a side view of the wafer 110 in FIG. 1H after wet etching to form the fiber-guiding v-groove according to an embodiment of the disclosure. Wet etching is a process that uses liquid chemicals such as potassium hydroxide (KOH) solution and tetramethyl ammonium hydroxide (TMAH) solution to remove materials from wafers, such as the wafer 110. For example, a wet etchant is applied through the opening 130 into the base semiconductor layer 111. The wet etching process removes a sixth portion 196 of the base semiconductor layer 111 to create a v-groove 150 in the base semiconductor layer 111. The v-groove 150 comprises a first pair of opposite v-shaped sidewalls 151 and 152 extending along an axis substantially perpendicular to the x-axis and substantially perpendicular to the z-axis, where the axis corresponds to the y-axis shown in FIG. 1C. The v-groove 150 further comprises a second pair of opposite v-shaped sidewalls extending along a direction of the x-axis. In order to show the v-groove 150, the second pair of opposite v-shaped sidewalls is not shown in FIG. 1I. The v-groove 150 further comprises a v-groove bottom surface 153 connecting to the first pair of v-shaped sidewalls 151 and 152 and the second pair of v-shaped sidewalls. The dimensions of the v-groove 150 are controlled by controlling the etching rate and etching time of the wet etch process such that the v-groove 150 may be used to substantially passively align an optical fiber to the waveguide 120. The wet etch process is controlled to provide a precision within about ±0.5 μm of accuracy for the v-groove 150 dimensions. In addition, the wet etch process removes other portions of the cladding layer 114 and the top semiconductor layer 113 that are adjacent to the opening 130 and causes undercuts 160 of the insulator layer 112.

Figure 1J:
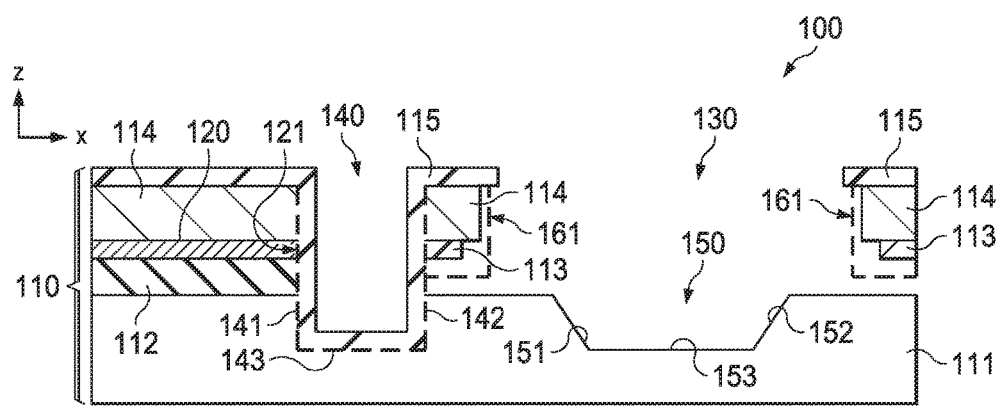
FIG. 1J is a side view of the wafer in FIG. 1I after removal of undercuts according to an embodiment of the disclosure.

FIG. 1J is a side view of the wafer 110 in FIG. 1I after removal of the undercuts 160 of the wafer 110 of FIG. 1I according to an embodiment of the disclosure. The undercuts 160 are removed by applying a buffering agent such as buffered hydrofluoric (BHF) acid or another suitable chemical solution. After the removal of the undercuts 160, portions 161 of the cladding layer 114 and the top semiconductor layer 113 are suspended over the base semiconductor layer 111. The removal of the undercuts 160 enables fiber attachment with a higher precision accuracy.

Figure 1K:
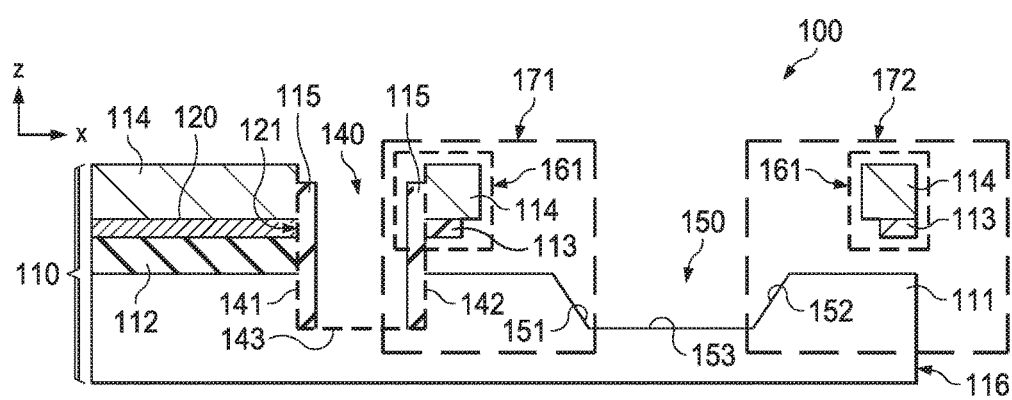
FIG. 1K is a side view of the wafer in FIG. 1J after removal of a portion of the protection layer according to an embodiment of the disclosure.

FIG. 1K is a side view of the wafer 110 in FIG. 1J after removal of a portion of the protection layer 115 according to an embodiment of the disclosure. As shown, the cladding layer 114 is reopened. However, portions of the protection layer 115 remain along the first trench sidewall 141 and the second trench sidewall 142 of the trench 140. Additional materials such as Si from the base semiconductor layer 111 and the top semiconductor layer 113, $SiO_2$ from the insulator layer 112, $SiO_x$ from the cladding layer 114, and $Si_3N_4$ from the protection layer 115 in a first region 171 and a second region 172 remain. The first region 171 is between the trench 140 and the first v-shaped sidewall 151. The second region 172 is between the v-shaped sidewall 152 and an edge 116 of the wafer 110.

Figure 1L:
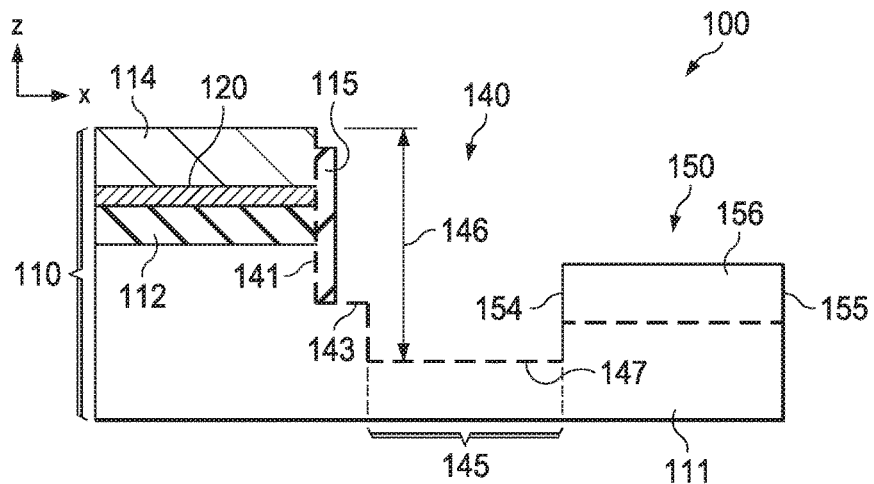
FIG. 1L is a side view of the wafer in FIG. 1K after removal of materials to connect the trench to the fiber-guiding v-groove according to an embodiment of the disclosure.

FIG. 1L is a side view of the wafer 110 in FIG. 1K after removal of materials to connect the trench 140 to the v-groove 150 according to an embodiment of the disclosure. As shown, after the removal of the first region 171 and the second region 172 in FIG. 1K, the v-groove 150 comprises a first open end 154 connecting to the trench 140 along a direction of the x-axis and a second open end 155 opposite to the first end 154 along the direction of the x-axis. In addition, the trench 140 is extended to comprise a second portion 145 with a second trench bottom surface 147 and a second trench depth 146. The second trench bottom surface 147 is positioned at a depth similar to the v-groove 150 to enable an optical fiber to be attached and coupled to the waveguide 120. The portion 156 corresponds to one of the second pair of v-shaped sidewalls extending along the x-axis described in FIG. 1I.

In one embodiment, dicing is used to remove additional materials in the first region 171 and the second region 172. Dicing is a mechanical process that employs mechanical sawing to cut through wafers. Dicing is typically used to cut through an entire wafer platform, which may comprise a height or depth of about 700 µm. However, in this embodiment, the dicing does not cut through the entire wafer 110. For example, the dicing depth is controlled to match the second trench depth 146, which may be about 80 µm.

In another embodiment, a photolithography process followed by an Si DRIE process are used to remove the first region 171 and the second region 172. This process may be more complex than dicing. After removing the first region 171 and the second region 172, wet etching is used to remove the protection layer 115 remaining along the first trench sidewall 141 of the trench 140.

FIG. 2A is a side view of a PIC 200 and an optical fiber 280 in a coupling position according to an embodiment of the disclosure. The PIC 210 is fabricated by employing the method 100. The PIC 210 may be any type of optical device. The PIC 210 comprises a base semiconductor layer 211 similar to the base semiconductor layer 111, an insulator layer 212 similar to the insulator layer 112, a top semiconductor layer 213 similar to the top semiconductor layer 113, a cladding layer 214 similar to the cladding layer 114. Similar to the wafer 110, the insulator layer 212 is disposed between the top semiconductor layer 213 and the base semiconductor layer 211, and the cladding layer 214 is disposed over the top semiconductor layer 213. The PIC 200 further comprises a waveguide 220 similar to the waveguide 120 formed in the top semiconductor layer 213, a trench 240 similar to the trench 140, and a fiber-guiding v-groove 250 similar to the v-groove 150 formed in the base semiconductor layer 211. The trench 240 connects the waveguide 220 to the fiber-guiding v-groove 250. The PIC 210 may further comprise other functional layers implementing any type of optical functions.

The optical fiber 280 is an SMF. The optical fiber 280 comprises a core 281 surrounded by cladding 282. The optical fiber 280 is positioned in the fiber-guiding v-groove 250. For example, the optical fiber 280 is attached to sidewalls 251 (see FIG. 2B) of the fiber-guiding v-groove 250 using epoxy or another suitable bonding material. As shown, the optical fiber 280 is coupled to the waveguide 220, where the core 281 of the optical fiber 280 is substantially aligned to the waveguide 220 along an optical path 283 or the x-axis. The z-axis is substantially perpendicular to a plane of the PIC 210 and the x-axis. The trench 240 comprises a trench sidewall 241 similar to the first trench sidewall 141. The trench sidewall 241 fixes the optical fiber 280 in the x-axis direction. A cover (not shown) may be used to cover the optical fiber 280 to improve mechanical strength. The center of the optical fiber 280 may be shifted from the optical path 283 due to the cladding 282. In that case, active alignment may be used to control the fiber-guiding v-groove 250.

FIG. 2B is a cross-sectional view of the PIC 200 in FIG. 2A according to an embodiment of the disclosure. The cross-sectional view is taken along a line 201 of FIG. 2A as viewed in the direction indicated by the arrows. As shown, an optical fiber 280 is attached to the sidewalls 251 of the v-groove 250. The v-groove 250 controls and secures the positioning of the optical fiber 280 in the y-axis direction and the z-axis direction. The y-axis is substantially perpendicular to the x-axis and substantially parallel to a plane of the PIC 210.

Figure 3:
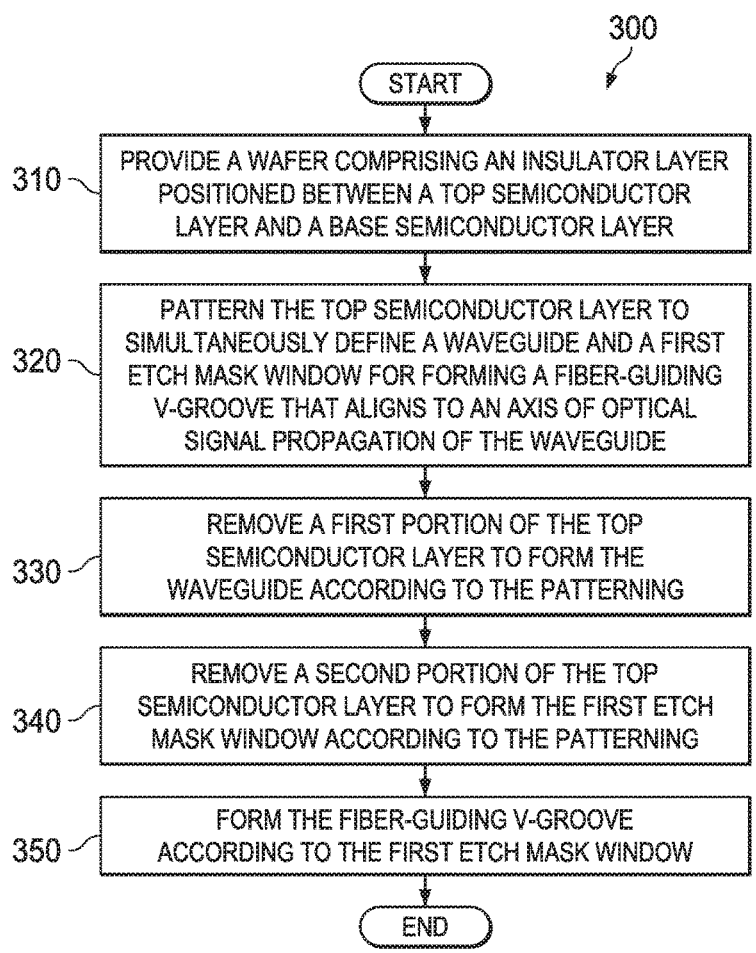
FIG. 3 is a flowchart of a method for fabricating fiber-guiding v-grooves on a PIC according to an embodiment of the disclosure.

FIG. 3 is a flowchart of a method 300 for fabricating fiber-guiding v-grooves such as the v-grooves 150 and 250 on a PIC such as the wafer 110 and the PIC 200 according to an embodiment of the disclosure. The method 300 is similar to the method 100. The method 300 is implemented during fabrication. At step 310, a wafer such as the wafer 110 of FIG. 1A is provided for fabrication. The wafer comprises an insulator layer such as the insulator layers 112 and 212 positioned between a top semiconductor layer such as the top semiconductor layers 113 and 213 and a base semiconductor layer such as the base semiconductor layers 111 and 211. At step 320, the top semiconductor layer is patterned to simultaneously define a waveguide such as the waveguides 120 and 220 and a first etch mask window such as the first etch mask window 131 for forming a fiber-guiding v-groove such as the v-grooves 150 and 250 that substantially aligns to an axis of optical signal propagation of the waveguide. The patterning of the top semiconductor layer is performed via photolithography. At step 330, a first portion such as the first portion 191 of the top semiconductor layer is removed to form the waveguide according to the patterning as shown in FIG. 1C. At step 340, a second portion such as the second portion 192 of the top semiconductor layer is removed to form the first etch mask window according to the patterning as shown in FIG. 1B. At step 350, the fiber-guiding v-groove is formed according to the first etch mask window by employing similar mechanisms as described in the method 100.

Figure 4:
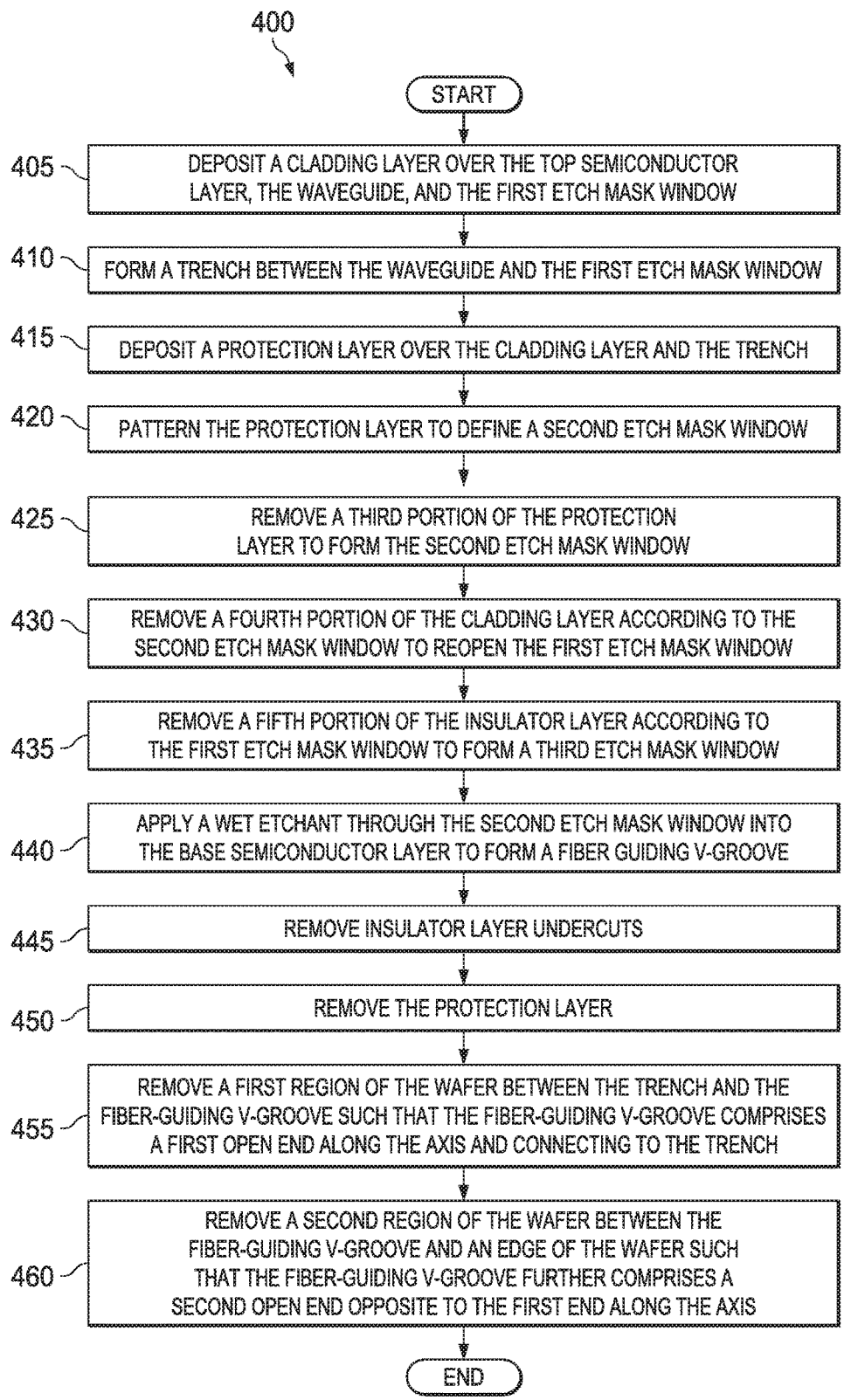
FIG. 4 is a flowchart of a method for fabricating fiber-guiding v-grooves on a PIC according to another embodiment of the disclosure.

FIG. 4 is a flowchart of a method 400 for fabricating fiber-guiding v-grooves such as the v-grooves 150 and 250 on a PIC such as the wafer 110 and the PIC 200 according to another embodiment of the disclosure. The method 400 is similar to the method 100. The method 400 is implemented during fabrication after performing the steps 310-340 of the method 300 to form a waveguide such as the waveguide 120 and 220 and a first etch mask window such as the first etch mask window 131 in a wafer such as the wafer 110 of FIG. 1A. For example, the wafer comprises an insulator layer such as the insulator layers 112 and 212 positioned between a top semiconductor layer such as the top semiconductor layers 113 and 213 and a base semiconductor layer such as the base semiconductor layers 111 and 211. The waveguide and the first etch mask window are formed in the top semiconductor layer as shown in FIGS. 1B and 1C. The first etch mask window is substantially aligned to an axis of optical signal propagation of the waveguide. At step 405, a cladding layer such as the cladding layer 114 is deposited over the top semiconductor layer, the waveguide, and the first etch mask window as shown in FIG. 1D. At step 410, a trench such as the trench 140 is formed between the waveguide and the first etch mask window as shown in FIG. 1E using photolithography and RIE. The trench extends vertically from a first top surface 117 of the cladding layer into the wafer and extends laterally from the waveguide to the first etch mask window. The RIE is configured to control a depth of the trench according to a diameter of an optical fiber, which may be used for subsequent attachment.

At step 415, a protection layer such as the protection layer 115 is deposited over the cladding layer and the trench as shown in FIG. 1F. At step 420, the protection layer is patterned to define a second etch mask window with a second window center and a second window size as shown in FIG. 1G. The second window center is substantially vertically aligned to a first window center of first etch mask window. The second window size is larger than a first window size of the first window. For example, the patterning uses a photolithography process. At step 425, a third portion similar to the third portion 193 of the protection layer is removed to form the second etch mask window. At step 430, a fourth portion such as the fourth portion 194 of the cladding layer is removed according to the second etch mask window to reopen the first etch mask window. At step 435, a fifth portion such as the fifth portion of the insulator layer is removed according to the first etch mask window to form a third etch mask window. For example, the first etch mask window, the second etch mask window, and the third etch mask window, each comprises a rectangular shape. The removal of the third portion, the fourth portion, and the fifth portion creates an opening with step-structured side walls extending from the protection layer to a second top surface such as the second top surface 118 of the base semiconductor layer as shown in FIG. 1H.

At step 440, a wet etchant is applied through the second etch mask window and the opening into the base semiconductor layer to form a fiber guiding v-groove as shown in FIG. 1I. For example, a sixth portion such as the sixth portion 196 is removed from the base semiconductor layer from the wet etching, where the sixth portion comprises a trapezoidal shape. The wet etching forms undercuts of the insulator layer such as the undercuts 160. At step 445, the insulator layer undercuts are removed as shown in FIG. 1J. At step 450, the protection layer is removed or at least a portion of the protection layer on top of the cladding layer is removed as shown in FIG. 1K. At step 455, a first region of the wafer such as the regions 171 between the trench and the fiber-guiding v-groove is removed such that the fiber-guiding v-groove comprises a first open end such as the first open end 154 along the axis and connecting to the trench as shown in FIG. 1L. At step 460, a second region of the wafer such as the second region 172 between the fiber-guiding v-groove and an edge such as the edge 116 of the wafer is removed such that the fiber-guiding v-groove further comprises a second open end such as the second open end 155 opposite to the first end along the axis as shown in FIG. 1L. The removal of the first region and the second region may be performed via dicing or a combination of photolithography and etching. Subsequently, remaining protection layer may be removed and the wafer may be cleaned.

The use of the term "substantially" means a range including ±10% of the subsequent modifier, unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for fabricating a photonic integrated circuit (PIC), comprising:
   providing a wafer comprising an insulator layer positioned between a top semiconductor layer and a base semiconductor layer;
   patterning the top semiconductor layer to simultaneously define a waveguide and a first etch mask window for forming a fiber-guiding v-groove that substantially aligns to an axis of optical signal propagation of the waveguide, wherein the patterning uses photolithography that comprises using light to transfer a geometric pattern from a photomask to a light-sensitive chemical photoresist (PR) coating on the top semiconductor layer;
   removing a first portion of the top semiconductor layer to form the waveguide according to the patterning;
   removing a second portion of the top semiconductor layer to form the first etch mask window according to the patterning; and
   forming the fiber-guiding v-groove according to the first etch mask window.

2. The method of claim 1, wherein removing the first portion and removing the second portion comprise using reactive-ion etching (RIE).

3. The method of claim 1, wherein removing only the first portion forms the waveguide, and wherein removing only the second portion forms the first etch mask window.

4. A method for fabricating a photonic integrated circuit (PIC), comprising:
   providing a wafer comprising an insulator layer positioned between a top semiconductor layer and a base semiconductor layer;
   patterning the top semiconductor layer to simultaneously define a waveguide and a first etch mask window for forming a fiber-guiding v-groove that substantially aligns to an axis of optical signal propagation of the waveguide;
   removing a first portion of the top semiconductor layer to form the waveguide according to the patterning;
   removing a second portion of the top semiconductor layer to form the first etch mask window according to the patterning;
   forming the fiber-guiding v-groove according to the first etch mask window;
   depositing, after removing the first portion and the second portion, a cladding layer over the top semiconductor layer, the waveguide, and the first etch mask window;
   forming, using a dry etching process, a trench between the waveguide and the first etch mask window;
   depositing a protection layer over the cladding layer and the trench; and
   patterning the protection layer to define a second etch mask window with a second window center and a second window size so that the second window center substantially vertically aligns to a first window center of the first etch mask window, wherein the second window size is larger than a first window size of the first etch mask window.

5. The method of claim 4, further comprising removing a third portion of the protection layer to form the second etch mask window.

6. The method of claim 5, further comprising removing a fourth portion of the cladding layer according to the second etch mask window to reopen the first etch mask window.

7. The method of claim 6, wherein forming the fiber-guiding v-groove comprises removing a fifth portion of the insulator layer according to the first etch mask window to form a third etch mask window for forming the fiber-guiding v-groove, wherein the first etch mask window, the second etch mask window, and the third etch mask window each comprises a rectangular shape, and wherein removing the third portion, the fourth portion, and the fifth portion creates an opening with step-structured side walls extending from the protection layer to a second top surface of the base semiconductor layer.

8. The method of claim 7, wherein forming the fiber-guiding v-groove further comprises applying a wet etchant through the opening into the base semiconductor layer to form the fiber-guiding v-groove in the base semiconductor layer.

9. The method of claim 8, wherein applying the wet etchant comprises forming undercuts of the insulator layer, and wherein the method further comprises removing the undercuts by using a buffering agent.

10. The method of claim 8, wherein the trench extends vertically from a first top surface of the cladding layer to the wafer and extends laterally from the waveguide to the first etch mask window, and wherein the method further comprises:
removing a first region of the wafer between the trench and the fiber-guiding v-groove such that the fiber-guiding v-groove comprises a first open end along the axis and connecting to the trench; and
removing a second region of the wafer between the fiber-guiding v-groove and an edge of the wafer such that the fiber-guiding v-groove further comprises a second open end opposite to the first open end along the axis.

11. The method of claim 10, wherein removing the first region and the second region comprises dicing the wafer from the first top surface of the cladding layer towards the base semiconductor layer.

12. The method of claim 10, wherein removing the first region and the second region comprises:
patterning the protection layer to define a first area corresponding to the first region and a second area corresponding to the second region; and
etching the first region and the second region.

13. A photonic integrated circuit (PIC) prepared by a process comprising the steps of:
providing a wafer comprising an insulator layer positioned between a top semiconductor layer and a base semiconductor layer;
patterning the top semiconductor layer to simultaneously define a waveguide and a first etch mask window for forming a fiber-guiding v-groove that substantially aligns to an axis of optical signal propagation of the waveguide, wherein the patterning uses photolithography that comprises using light to transfer a geometric pattern from a photomask to a light-sensitive chemical photoresist (PR) coating on the top semiconductor layer;
removing a first portion of the top semiconductor layer to form the waveguide according to the patterning;
removing a second portion of the top semiconductor layer to form the first etch mask window according to the patterning; and
forming the fiber-guiding v-groove according to the first etch mask window.

14. The PIC of claim 13, wherein the process further comprises:
depositing, after removing the first portion and the second portion, a cladding layer over the top semiconductor layer, the waveguide, and the first etch mask window;
forming, using a reactive-ion etching (RIE) process, a trench between the waveguide and the first etch mask window;
depositing a protection layer over the cladding layer and the trench; and
patterning the protection layer to define a second etch mask window with a second window center and a second window size so that the second window center substantially vertically aligns to a first window center of the first etch mask window, wherein the second window size is larger than a first window size of the first etch mask window.

15. The PIC of claim 14, wherein the process further comprises:
removing a third portion of the protection layer to form the second etch mask window; and
removing a fourth portion of the cladding layer according to the second etch mask window to reopen the first etch mask window,
wherein forming the fiber-guiding v-groove comprises removing a fifth portion of the insulator layer according to the first etch mask window to form a third etch mask window for forming the fiber-guiding v-groove.

16. The PIC of claim 15, wherein forming the fiber-guiding v-groove further comprises applying a wet etchant through the third etch mask window into the base semiconductor layer to form the fiber-guiding v-groove in the base semiconductor layer.

17. The PIC of claim 16, wherein applying the wet etchant comprises forming undercuts of the insulator layer, and wherein the process further comprises removing the undercuts by using a buffered hydrofluoric (BHF) solution.

18. The PIC of claim 17, wherein the trench extends vertically from a top surface of the cladding layer into the wafer and extends laterally from the waveguide to the first etch mask window, and wherein the process further comprises dicing from the top surface of the cladding layer partially through the wafer to:
remove a first region of the wafer between the trench and the fiber-guiding v-groove such that the fiber-guiding v-groove comprises a first open end along the axis connecting to the trench; and
remove a second region of the wafer between the fiber-guiding v-groove and an edge of the wafer such that the fiber-guiding v-groove further comprises a second open end opposite to the first open end along the axis.

19. The PIC of claim 13, wherein the waveguide consists of a single composition.

* * * * *